(12) United States Patent
Huo et al.

(10) Patent No.: US 11,766,673 B2
(45) Date of Patent: Sep. 26, 2023

(54) GRINDING ROLLER FOR WASTE TIRES AND MULTIFUNCTIONAL CRUSHER HAVING THE SAME GRINDING ROLLER

(71) Applicants: Yun Huo, Henan (CN); Zhengqing Huo, Henan (CN)

(72) Inventors: Yun Huo, Henan (CN); Zhengqing Huo, Henan (CN)

( * ) Notice: Subject to any disclaimer, the term of this patent is extended or adjusted under 35 U.S.C. 154(b) by 0 days.

(21) Appl. No.: 18/066,311

(22) Filed: Dec. 15, 2022

(65) Prior Publication Data

US 2023/0166267 A1    Jun. 1, 2023

Related U.S. Application Data

(63) Continuation of application No. PCT/CN2021/079764, filed on Mar. 9, 2021.

(51) Int. Cl.
  *B02C 4/30*    (2006.01)
  *B02C 4/20*    (2006.01)
  *B02C 4/28*    (2006.01)

(52) U.S. Cl.
  CPC ............... *B02C 4/30* (2013.01); *B02C 4/20* (2013.01); *B02C 4/286* (2013.01); *B02C 2201/04* (2013.01)

(58) Field of Classification Search
  CPC .. B02C 4/30; B02C 4/305; B02C 4/20; B02C 4/08; B02C 4/12
  USPC ..................... 241/294; 492/33, 34
  See application file for complete search history.

(56) References Cited

U.S. PATENT DOCUMENTS

| | | | | |
|---|---|---|---|---|
| 3,438 A * | 2/1844 | Battin | ....................... | B02C 4/30 241/235 |
| 295,764 A * | 3/1884 | Hungerford | .............. | B02C 4/12 241/295 |
| 556,187 A * | 3/1896 | Holland | .................... | B02C 4/12 241/293 |
| 679,821 A * | 8/1901 | Arnold | ...................... | B02C 4/30 492/40 |
| 1,551,875 A * | 9/1925 | Hall | .......................... | B02C 4/30 81/9.51 |

(Continued)

FOREIGN PATENT DOCUMENTS

| | | |
|---|---|---|
| CN | 201346477 Y | 11/2009 |
| CN | 103769268 A | 5/2014 |

(Continued)

OTHER PUBLICATIONS

International Search Report of PCT Patent Application No. PCT/CN2021/079764 dated Nov. 30, 2021.

*Primary Examiner* — Faye Francis

(57) ABSTRACT

Disclosed is a grinding roller for waste tires and a multifunctional crusher having the grinding roller. The grinding roller comprises a roll shaft and a plurality of grinding components. The grinding components each comprise a grinding frame and grinding blocks mounted in grooves of the grinding frame. Each grinding block has a grinding surface that protrudes with respect to the grooves. Axial interval adjusting rings are disposed on the ring shaft for separating the grinding components at a predetermined distance to cut waste tires into blocks. The crusher comprises a box for housing the grinding roller. The box is provided with a material inlet and a material outlet. Axial blockers are mounted on the crusher to help grind waste tires into fine powder.

13 Claims, 4 Drawing Sheets

(56) References Cited

U.S. PATENT DOCUMENTS

| | | | | |
|---|---|---|---|---|
| 2,241,491 A * | 5/1941 | Treloar | ...................... | B02C 4/30 241/242 |
| 2,589,603 A * | 3/1952 | Cohen | ...................... | B02C 4/30 125/11.01 |
| 2,781,176 A * | 2/1957 | Clark | ...................... | B02C 18/186 241/294 |
| 3,107,867 A * | 10/1963 | Svensson | ................ | B02C 17/22 241/102 |
| 4,391,026 A * | 7/1983 | Casey | ...................... | B30B 9/20 241/293 |
| 4,560,112 A * | 12/1985 | Rouse | .................. | B23D 31/008 241/DIG. 31 |
| 5,000,392 A * | 3/1991 | Kästingschäfer et al. | .................... | B02C 4/305 492/38 |
| 5,340,034 A * | 8/1994 | Jang | .................... | B02C 18/0007 241/3 |
| 5,730,375 A * | 3/1998 | Cranfill | ................ | B02C 18/142 241/292.1 |
| 6,695,240 B2 * | 2/2004 | Rajewski | .................. | B02C 4/08 241/295 |
| 8,480,019 B1 * | 7/2013 | Scherer | .................. | A01D 41/12 241/293 |
| 8,511,597 B2 * | 8/2013 | Tada | ........................ | B02C 4/08 241/189.1 |
| 9,833,785 B2 * | 12/2017 | Den Boer | ............ | B23K 26/342 |
| 2002/0166911 A1 * | 11/2002 | Rajewski | ............... | B02C 18/142 241/295 |
| 2004/0251360 A1 * | 12/2004 | Everson | .................... | B02C 4/30 241/294 |
| 2006/0016923 A1 * | 1/2006 | Lee | ...................... | B26D 7/2614 241/294 |
| 2010/0189519 A1 * | 7/2010 | Kerf | ...................... | B02C 18/186 407/51 |
| 2014/0166797 A1 * | 6/2014 | Den Boer | ............... | B23P 15/00 241/296 |
| 2016/0263580 A1 * | 9/2016 | Rhea | ........................ | B02C 4/30 |
| 2016/0367994 A1 * | 12/2016 | Birtch | .................... | B02C 4/305 |
| 2019/0240861 A1 * | 8/2019 | Daining | ................ | A01G 23/067 |
| 2020/0197947 A1 * | 6/2020 | Verzilli | ................. | B02C 18/145 |

FOREIGN PATENT DOCUMENTS

| | | |
|---|---|---|
| CN | 204712312 U | 10/2015 |
| CN | 206082742 U | 4/2017 |
| CN | 107127910 B | 2/2019 |
| CN | 109664439 A | 4/2019 |
| CN | 110154277 A | 8/2019 |
| CN | 209222227 U | 8/2019 |
| CN | 209697037 U | 11/2019 |
| CN | 210522636 U | 5/2020 |
| CN | 210613863 U | 5/2020 |
| CN | 110154277 B | 6/2020 |
| DE | 202013104078 U1 | 9/2013 |

* cited by examiner

GRINDING ROLLER FOR WASTE TIRES AND MULTIFUNCTIONAL CRUSHER HAVING THE SAME GRINDING ROLLER

CROSS REFERENCE TO RELATED APPLICATIONS

The present application is a Continuation Application of PCT Application No. PCT/CN2021/079764 filed on Mar. 9, 2021, the contents of which are incorporated herein by reference in their entirety.

BACKGROUND

Field of Invention

The present invention relates to a technical field of crushing equipment, and more particularly to a grinding roller for waste tires and a multifunctional crusher with the grinding roller.

Description of Related Arts

With global industrialization and the rapid development of the automobile industry, there has been a dramatic increase in car tires, a necessary part of the vehicle, and with this comes the problem of recycling waste tires. Crusher is an indispensable piece of equipment in the process of recycling waste tires. Conventional crushers cut the waste tires into strips with a strip-cutting device, then break the strips with a crushing device. The strip-cutting device and the crushing device generally use a fixed-mounted tooth roller, which cannot control the width of strips. And it is difficult to maintain or repair the crusher. Moreover, other methods of recycling waste tires, such as freezing or oil refining, are often costly and suffer from secondary pollution.

Chinese patent application (Appl. No. CN 109664439 A) discloses a recycling system for resources, which comprises a machine body, a strip-cutting device, a crushing device, and a filter screen. The upper part of the said machine body is provided with a feed hopper. The strip-cutting device is disposed in a strip-cutting cavity of the machine body. The crushing device is disposed in a crushing cavity of the machine body. The filter screen is disposed in a receiving cavity of the machine body and below the crushing device. The disclosed recycling system is configured to crush waste tires and thus improve resource utilization. However, in practical operation, it is difficult to maintain or repair the disclosed recycling system, and the cutting width of tire strips cannot be controlled.

Chinese patent (Pat. No. CN 107127910 B) discloses a crusher for recycling tire rubber. The crusher includes a cutting device having two tooth rollers engaged with each other, a material barrel, and a rotary cutting barrel. The said material barrel is located above the rotary cutting barrel. A cutter is disposed between the material barrel and the rotary cutting barrel, driven by a driving element. The cutting device is located below the rotary cutting barrel. The crusher takes advantage of the cutter that cuts the tires and the two tooth rollers that shred the rubber strips to avoid most of the dense textured structure, thereby reducing damage to the cutter and extending the service life. But the crusher is difficult to overhaul and inconvenient to operate.

Chinese patent (Pat. No. CN 110154277 B) discloses a crushing device for waste tires and a multifunctional crusher with the crushing device. The crushing device includes a roll shaft and crushing components disposed on the roll shaft. The roll shaft contains a main shaft, a main body fixedly mounted on the main shaft, and a plurality of roll shaft blockers disposed on the sides of the main shaft along a shaft axis. A plurality of roll shaft bulges is disposed around the main body in a circumferential direction, forming a roll shaft groove between adjacent roll shaft bulges. When used to crush different types of waste tires, the crushing device requires the manufacture and replacement of different crushing components. The crushing device is not convenient for industrial applications due to poor versatility, low efficiency, and high manufacturing cost.

SUMMARY OF THE INVENTION

Aiming at the deficiencies in the prior art, especially at the defects of the Chinese patent (Pat. No. CN 110154277 B,) the present invention provides a grinding roller for waste tires and a multi-functional crusher having the grinding roller. The grinding roller comprises a roller shaft and grinding components arranged on the roller shaft. The grinding components comprise a grinding frame and grinding blocks, in which the grinding frame is provided with grooves for receiving the grinding blocks. The grooves are disposed on a peripheral part of the grinding frame and are spaced at equal intervals along a circumferential direction of the grinding frame. The grooves each extend longitudinally and radially with respect to the roll shaft. The grinding blocks each comprise a grinding surface and a threaded hole in a central part of the grinding block. The height of the grinding surface with respect to a bottom of the groove is larger than that of a top surface of the groove. The threaded hole is configured for mounting the grinding block into the groove. Hence, the shape and the number of the grinding blocks match the shape and the number of the grooves, respectively.

Preferably, for application for various types of tires and for satisfying various crushing requirements, the roll shaft is provided with axial interval adjusting rings that are used for separating the grinding components at a predetermined distance.

Preferably, each grinding block comprises an evacuating groove for removing scraps.

Preferably, for convenient discharging and replacing, the grinding blocks are mounted on the grinding frame through bolt connections.

In addition, the present invention provides a multifunctional crusher for waste tires, the multifunctional crusher comprising the grinding roller as set forth. The multifunctional crusher further comprises a box and a cover plate disposed on the box, forming a relatively sealed grinding space in the box. The box comprises a material inlet and a material outlet.

Preferably, the box is provided with a first pushing mechanism on one side for pushing the waste tire toward the grinding roller, and a second pushing mechanism on another side for pushing the cover plate.

In order to crush waste tires more sufficiently, the multifunctional crusher further comprises axial blockers extending along an axial direction of the roll shaft, and disposed between the grinding roller and a top of the box and between the grinding roller and a bottom of the box.

In another embodiment, in order to make the crushing more adequate, the multifunctional crusher further comprises axial blockers extending along the axial direction, and disposed between the grinding roller and a left side plate of the box and between the grinding roller and a right side plate of the box.

Preferably, an arc-shaped plate for collecting scraps of waste tires is disposed below the axial blockers.

Further, the axial blockers and the axial blockers both are engaged with the grinding roller.

Compared with the prior art, the present invention has benefits as follows:

(1) The grinding components used in the grinding roller disclosed in the present invention is detachable. The grinding blocks are connected to the grinding frame of the grinding components, for example, by bolt connections. Therefore, as an important working element, the grinding blocks can be discharged and replaced independently. With a configuration of the grinding blocks and the grinding component which can be flexibly adjusted according to actual working conditions, the grinding roller of the present invention is convenient for use and maintenance.

(2) When waste tires need to be crushed into blocks, axial interval adjusting rings are mounted on the roll shaft to meet different requirements for the size of crushed blocks, thus providing solid versatility.

(3) With the improved grinding roller as above, the crusher of the present invention increases crushing efficiency and allows for grinding waste tires into blocks as well as into powder. Capable of single-roller form, double-roller form, or multiple-roller form, the crusher can be used to recycle waste tires of different sizes. With multiple functions, the crusher is promising in wide and popular applications in the industry.

These and other features, aspects, and advantages of the present invention will become better understood with reference to the following description and appended claims.

BRIEF DESCRIPTION OF THE DRAWINGS

For a further understanding of these and other objects of the present invention, reference will be made to the following detailed description of the invention which is to be read in connection with the accompanying drawings, wherein.

DETAILED DESCRIPTION

The present invention is further illustrated with the specific embodiments as follows. One skilled in the art can easily know the advantages and effects of the present invention from the disclosure of this specification. It should be known that, the structure, proportion, size and so on shown in the attached drawings of the specification are all only for matching the contents disclosed in the specification. So that one skilled in the art can know and read the technical solutions of the present invention, which are not for limiting the implementation of the present invention and do not have the substantive meaning in technology. Without influencing the generable effects and accomplishable objects of the present invention, any structural modification, change of the proportional relation, or the adjustment of the size should be all encompassed in the range of the technical solutions of the present invention. Meanwhile, the terms such as "up", "down", "left", "right", "front", "back", "middle" and "one" referred in the specification are only for clear description, not for limiting the implementable scope of the present invention. Without the substantive change of the technical solutions, the change or adjustment of the relative relation is also seen as the implementable scope of the present invention.

As shown in FIGS. 1-7, the present invention protects a grinding roller for waste tires and a multifunctional crusher with this grinding roller. The grinding roller, the crusher, and the relevant components are specified respectively as follows.

About Grinding Roller

Preferred Embodiment 1

Figure 1:
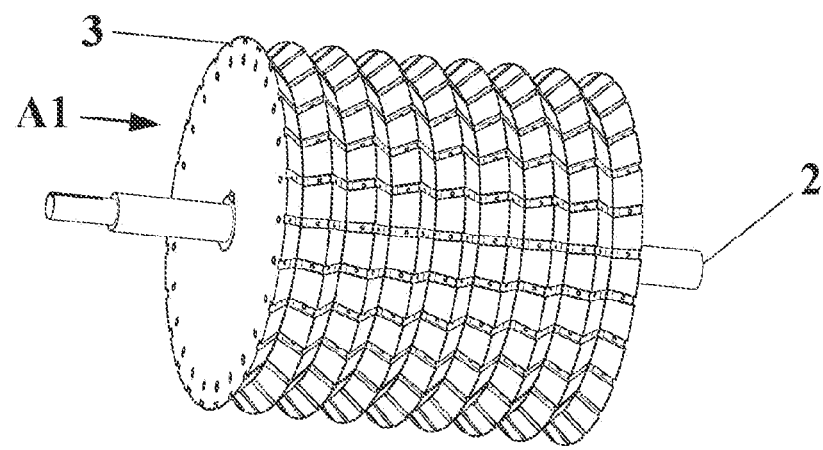
FIG. 1 is a structural sketch view of the grinding roller according to embodiment 1 of the present invention.
Figure 2:
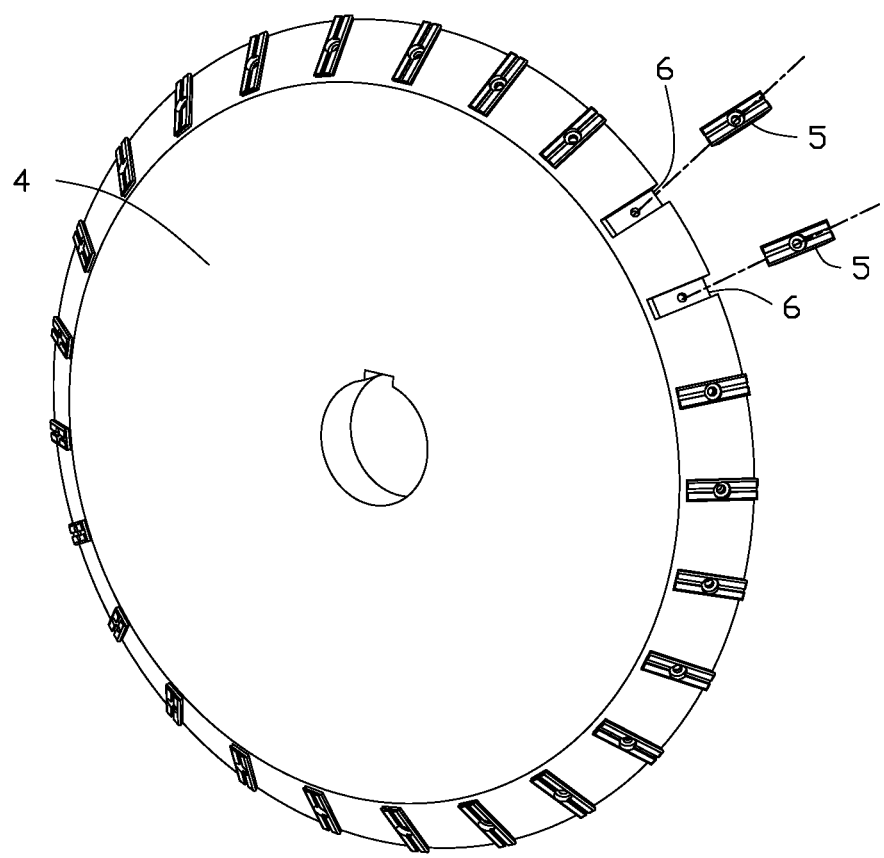
FIG. 2 is a structural sketch view of the grinding frame in FIG. 1.
Figure 3:
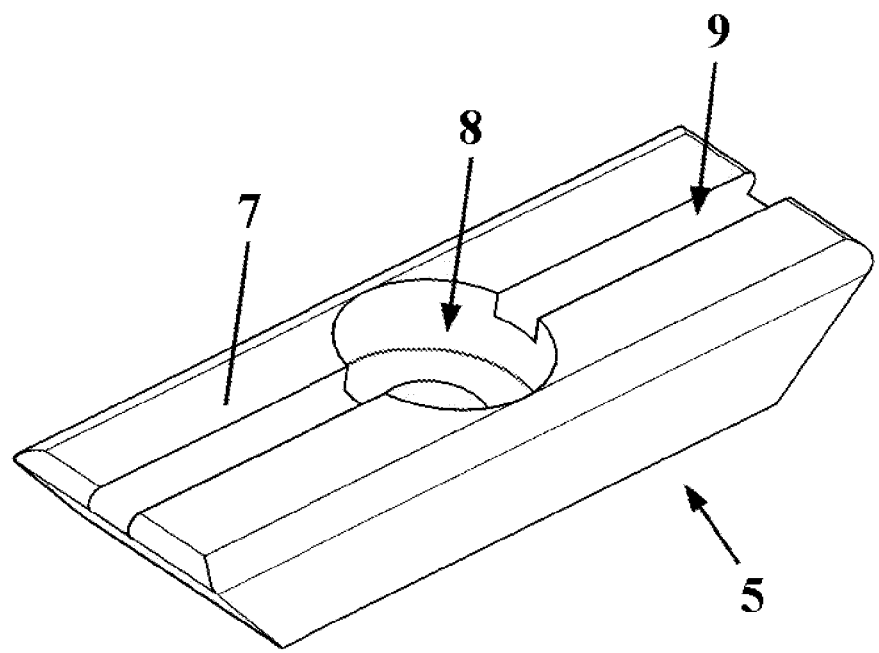
FIG. 3 is a structural sketch view of the grinding block in FIG. 1.

As shown in FIG. 1, the present invention discloses a grinding roller A1 for waste tires, comprising a roll shaft 2 and grinding components 3 arranged on the roll shaft 2. Specifically, the grinding components 3 each comprises a through hole in the center for receiving the roll shaft 2, the inner diameter of the through hole being fitted for an outer diameter of the roll shaft 2. Preferably, the grinding components 3 are mounted on the roll shaft 2 through key connections. In other embodiments, the grinding components 3 are connected to the roll shaft 2 using some other shaft connections. Referring to FIG. 2 and FIG. 3, the grinding component 3 each comprises a grinding frame 4 and grinding blocks 5. The grinding frame 4 is provided with grooves 6 for receiving the grinding blocks 5. The grooves 6 are disposed at a peripheral part of the grinding frame 4 and are spaced at equal intervals along a circumferential direction. The grinding blocks 5 each comprise a grinding surface 7 and a threaded hole 8 located in the center, the threaded hole 8 being configured for mounting one of the grinding blocks 5 in one of the grooves 6. Hence the shape and number of the grinding blocks 5 should match those of the grooves 6. It should be noted that the grinding blocks 5 can adopt any kind of material with a grinding function according to application requirements.

Preferably, for convenient replacement and disassembly, the grinding blocks 5 are connected to the grinding frame 4 through bolted connections. And for removing scraps efficiently, the grinding blocks 5 are arranged in the grooves 6 such that the grinding blocks 5 protrude from the grinding frame 4, i.e., the height of the grinding surface 7 with respect to a bottom surface of the groove 6 is greater than that of a top surface of the groove 6. In order to further facilitate chip removal, the grinding blocks 5 each is provided with an evacuating groove 9, and the evacuating groove 9 is preferably in the shape of a cuboid strip, (as shown in FIG. 3), and other shapes may also be used, which is not limited thereto.

Preferably, the grinding frame 4 is in a shape of a circular truncated cone with a relatively large diameter on one side and a relatively small diameter on the other side. The grooves 6 each extends along an axial direction and a radial direction with respect to the roll shaft 2. An included angle between one of the grooves 6 and the roll shaft 2 is in the range of 0-80°.

It should be noted that the grinding roller A1 of Embodiment 1 is mainly used when crushing the waste tires into powder products, and the shapes of the grinding frame 4, the grinding blocks 5, and the grooves 6 can be flexibly selected and adjusted depends on situations. A preferred shape shown in FIG. 1 is selected only for the illustration of this embodiment. Moreover, besides the preferred bolt connections, the grinding blocks 5 can be connected to the grinding frame 4 by other methods. For other embodiments, the grinding block 5 may not be provided with an evacuating groove.

Preferred Embodiment 2

Figure 4:
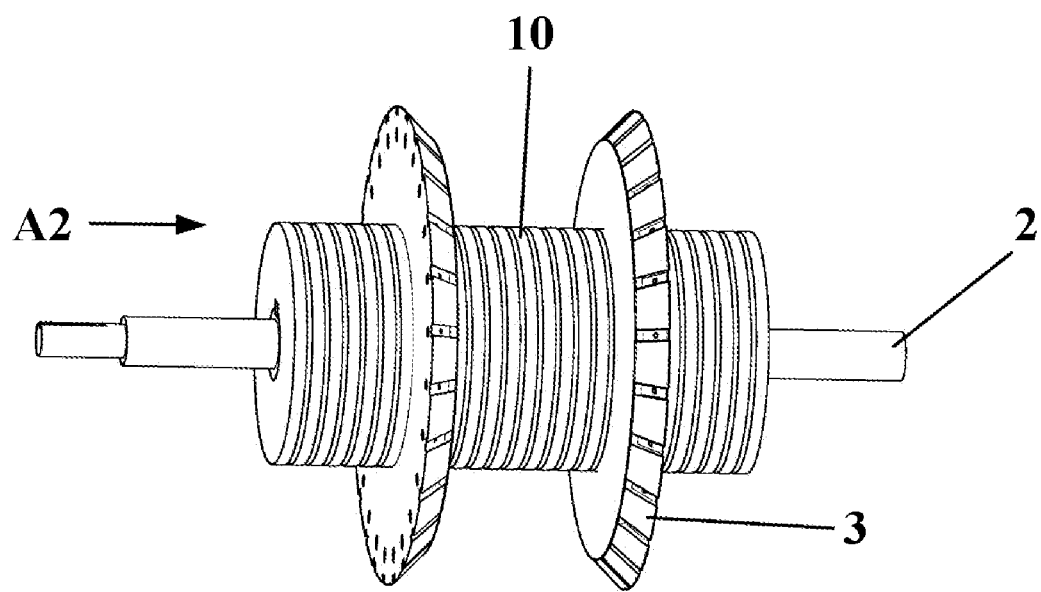
FIG. 4 is a structural sketch view of the grinding roller according to embodiment 2 of the present invention.

FIG. 4 shows a structural sketch view of the grinding roller A2 in embodiment 2 of the present invention. The grinding roller A2 of this embodiment is mainly used to crush waste tires into block products. Like the grinding roller A1 in embodiment 1, the grinding roller A2 comprises a roll shaft 2 and grinding components 3 arranged on the roll shaft 2, the grinding components 3 each comprising a grinding frame 4 and grinding blocks 5. The difference between the grinding roller A1 in embodiment 1 and the grinding roller A2 in embodiment 2 is that, the grinding roller A2 further comprises axial interval adjusting rings 10 that are configured for separating the grinding components 3 at a predetermined distance.

Figure 5:
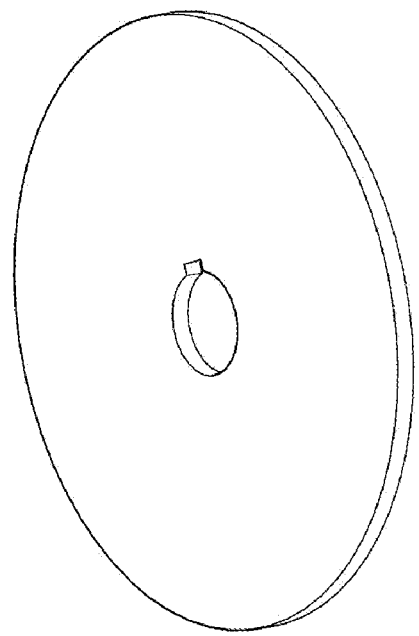
FIG. 5 is a structural sketch view of the axial interval adjusting rings in FIG. 4.

FIG. 5 shows a structural sketch view of an axial interval adjusting ring 10. A through hole having a diameter fitted for the diameter of the roll shaft 2 is disposed on a center part of the axial interval adjusting ring 10. Preferably, the axial interval adjusting ring 10 is mounted on the roll shaft 2 by key connections. In other embodiments, the axial interval adjusting rings 10 are connected to the roll shaft 2 by other shaft connections. According to actual working conditions, i.e., the particle size of lumpy products obtained by crushing waste tires, the number of and the spacing between the grinding components 3 can be determined in advance. Thus the number and positions of the axial interval adjusting rings 10 can be adjusted so that the grinding components 3 are arranged at a predetermined distance. It should be noted that the arrangement of the grinding components 3 can be flexibly adjusted, not limited to "back-to-back" form shown in FIG. 4. For example, the grinding components 3 can be arranged such that the surface with a larger diameter of the two surfaces in each of the grinding components 3 faces the same direction, or in a "face-to-face" manner.

About Crusher

Preferred Embodiment 3

Figure 6:
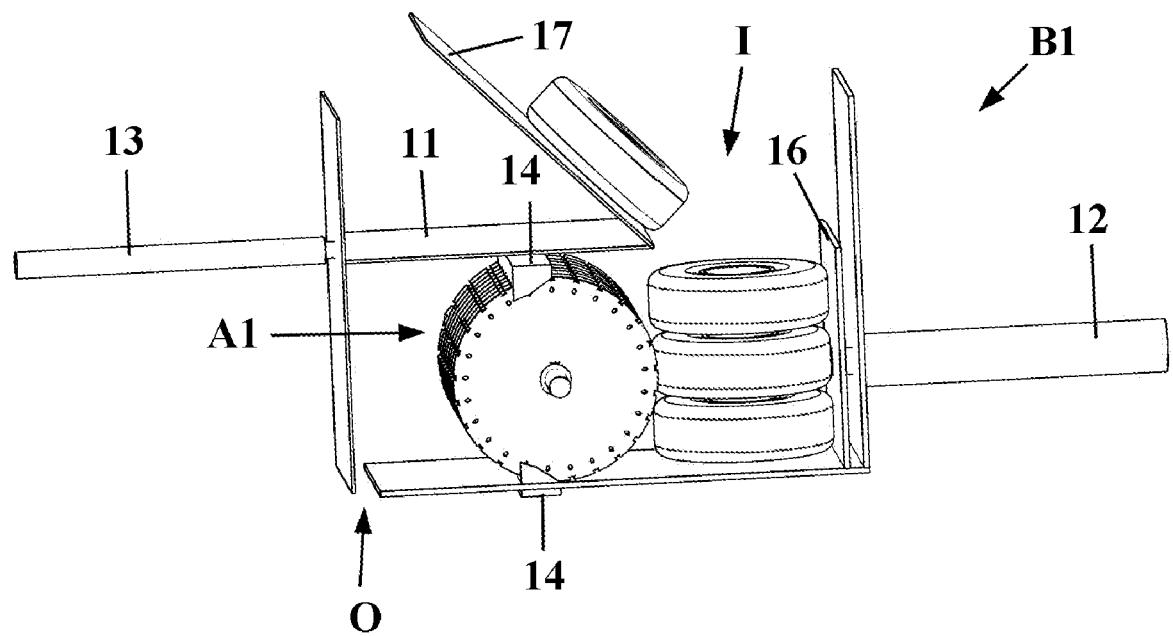
FIG. 6 is a structural sketch view of the crusher according to embodiment 3 of the present invention.

As shown in FIG. 6, the present invention discloses a crusher B1 for waste tires, comprising a grinding roller A1 and a box. The top of the box is provided with a cover plate 11. A support plate 17 is connected to the cover plate 11 and is oblique with respect to the cover plate 11, along which the waste tires enter the box. The box further comprises a material inlet I and a material outlet O. And preferably, the material inlet I and the material outlet O are located at positions diagonal to each other in the box. As shown in FIG. 6, the material inlet I is in the upper right part of the box, and the material outlet O is in the lower left part of the box. In other embodiments, the material inlet I and the material outlet O can be positioned in other parts of the box.

The main features of the crusher B1 in this embodiment lie in that a first pushing mechanism 12 is disposed on a first side of the box and is configured for pushing the waste tires toward the grinding roller A1, and a second pushing mechanism 13 is disposed on a second side of the box and is configured for pushing the cover plate 11. Further, a pushing plate 16 is disposed on the first pushing mechanism 12, for pushing waste tires toward the grinding roller A1. The first pushing mechanism 12 and the second pushing mechanism 13 are pushing mechanisms that are regularly used in the field of hydraulic cylinders or similar fields.

Figure 8:
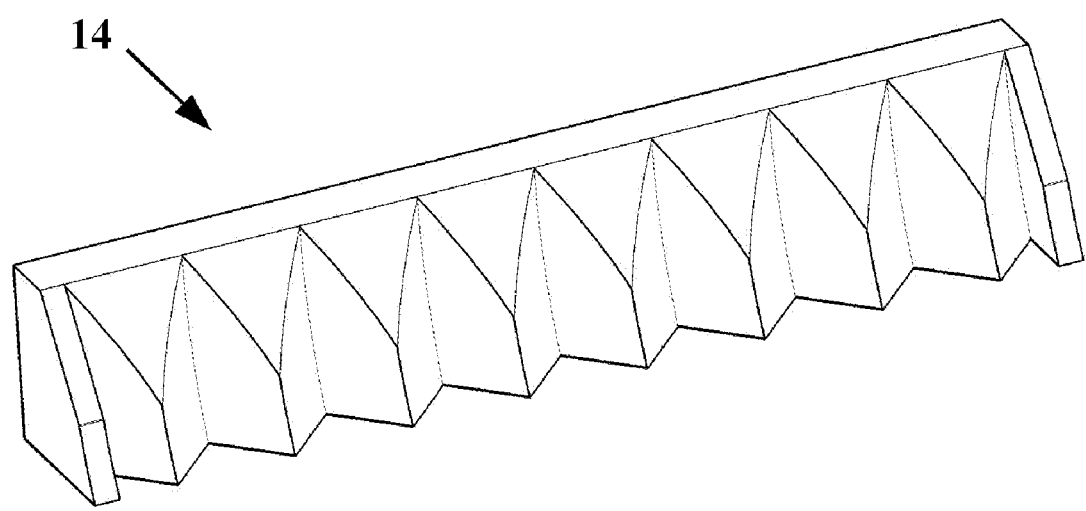
FIG. 8 is a structural sketch view of the axial blockers in FIG. 6 and in FIG. 7.

Referring to FIG. 6, the crusher B1 is mainly applied for crushing waste tires into powder, and the grinding roller A1 (shown in FIG. 1) containing no axial interval adjusting rings is employed. Gaps between the grinding roller A1 and a top or a bottom of the box usually result in deficient crushing, leading to large particle sizes that are unwanted. Preferably, for more sufficient crushing, axial blockers 14 extending along an axial direction of the grinding roller A1, are arranged between the grinding roller A1 and a top of the box and between the grinding roller A1 and a bottom of the box (i.e., the upper and lower positions.) The axial blockers 14 are engaged with the grinding roller A1 (as shown in FIG. 8) to form a relatively sealed crushing space, thereby improving the crushing efficiency. In this case, waste tires are conveyed into the box of the crusher B1 through the material inlet I, the material inlet I is closed by the cover plate 11 driven by the second pushing mechanism 13, the waste tires are pushed toward the grinding roller A1 at a predetermined speed by the first pushing mechanism 12, and the crushing products (in powder) are released from the crusher via the material outlet O.

It should be noted that if the waste tires are required to be crushed into blocks, the grinding roller A2 (shown in FIG. 4) is employed in the crusher B1, which is provided with axial interval adjusting rings 10. In this case, the axial blockers 14 are no longer needed. In addition, although the crusher B1 as shown in FIG. 6 uses a single grinding roller, i.e., merely a single grinding roller is applied, two or more grinding rollers can be employed based on practical crushing requirements in other embodiments where the size of waste tires is relatively larger. Preferably in that condition, the two or more grinding rollers can be engaged with each other and aligned in an up-and-down array or other forms of arrays according to actual working conditions.

Preferred Embodiment 4

Figure 7:
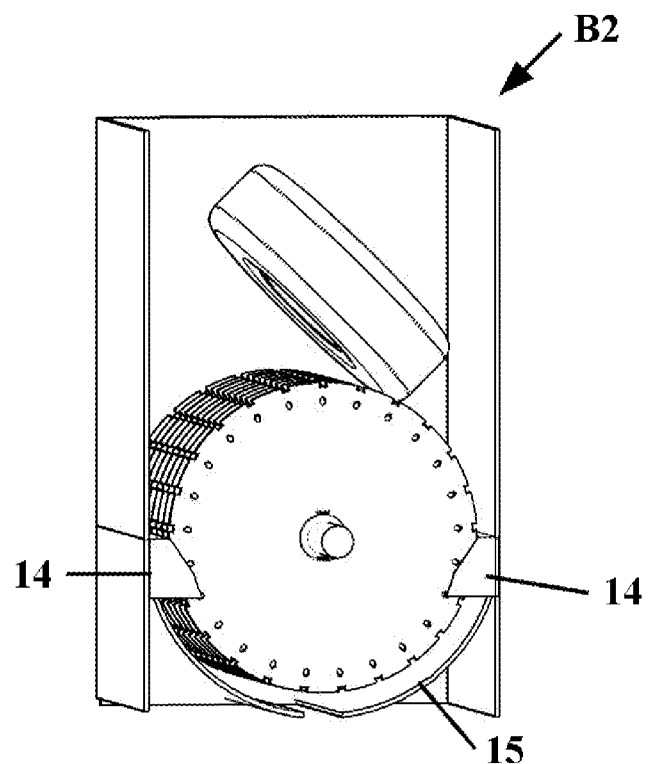
FIG. 7 is a structural sketch view of the crusher according to embodiment 4 of the present invention.

FIG. 7 shows a structural sketch view of the crusher B2 in embodiment 4 of the present invention. The main difference between the crusher B2 and the crusher B1 lies in that the crusher B2 is not provided with the pushing mechanism 12, which is employed in the crusher B1. In the crusher B2, the waste tire falls by gravity into the box through the material inlet I on a top of the box. After the crushing work is finished, the crushed products are release from the box via the material outlet O on a bottom of the box. Additionally, in the case where the crusher B2 is applied to crush waste tires into powder, the grinding roller A1 without an axial interval rings 13 (as shown in FIG. 1) would be used, and axial blockers 14 would be installed and located in different positions from the blockers 14 in the crusher B1. Specifically, the axial blockers 14 in crusher B2 of this embodiment, are disposed on a left side and a right side of the grinding roller, i.e., the axial blockers 14 are arranged between the grinding roller A1 and a left side plate of the box and between the grinding roller A1 and a right side plate of the box, extending along the axial direction of the grinding roller A1. The axial blockers 14 are engaged with the grinding roller A1 (as shown in FIG. 8) to form a relatively sealed crushing space, thereby improving the crushing efficiency. Moreover, an arc-shaped plate 15 is provided below the axial blockers 14, and the crushing products are collected at the material outlet O through the arc-shaped plate 15.

It should be noted that the crusher B2 can employ the grinding roller A2 provided with axial interval adjusting rings (as shown in FIG. 4) when used to crush waste tires into blocks. In that case, the axial blockers 14 would not necessarily be required. Further, although the crusher B2 as shown in FIG. 7 adopts a single-roller form, i.e., merely a single grinding roller is employed, it can be modified into a double-roller form (with two grinding rollers) or a multiple-roller form (with multiple grinding rollers) according to actual working conditions and in the case where the size of waste tires is relatively larger. Preferably in that condition, the two or more grinding rollers can be engaged with each other and aligned in a left-and-right array or other forms of arrays as specifically required.

Regarding the section about crusher, in addition to the components as mentioned above, a crusher can also include a cooling medium mechanism and/or a recovery mechanism, which can be conventionally selected according to actual working conditions. And they will not be described here as they are not part of the inventive points of the present invention.

The embodiments as set forth merely describe the preferred embodiments of the technical solutions of the present invention, and do not limit the scope of this invention. Various modifications and variations made to the technical solutions of this invention by one ordinarily skilled in the art without departing from the scope and spirit disclosed by the appended claims of the present invention, shall all fall in the protection extent of the claims of present disclosure.

What is claimed is:

1. A grinding roller for waste tires, comprising a roll shaft and a plurality of grinding components arranged on the roll shaft;
   wherein:
   each of the plurality of grinding components comprises a plurality of grinding blocks and a grinding frame comprising a plurality of grooves on a peripheral part thereof, and the plurality of grinding blocks, the number of which is the same as the number of the plurality of grooves, are configured be mounted in the plurality of grooves in a one-to-one manner;
   in each of the plurality of grinding components:
   the plurality of grooves are spaced at constant intervals along a circumferential direction of the grinding frame;
   the plurality of grooves each extends longitudinally and radially with respect to an axis of the roll shaft;
   the plurality of grinding blocks each comprises a grinding surface and a threaded hole located in a central part of the grinding surface;
   when one of the plurality of grinding blocks is mounted in a corresponding one of the plurality of grooves, a height of the grinding surface with respect to a bottom of the one of the plurality of grooves is larger than a height of a top surface of the corresponding one of the plurality of grooves with respect to the bottom of the one of the plurality of grooves.

2. The grinding roller of claim 1, wherein the roll shaft is provided with axial interval adjusting rings for separating the plurality of grinding components at a predetermined distance.

3. The grinding roller of claim 1, wherein each of the plurality of grinding blocks further comprises an evacuating groove.

4. The grinding roller of claim 2, wherein each of the plurality of grinding blocks further comprises an evacuating groove.

5. The grinding roller of claim 3, wherein the plurality of grinding blocks are fixed on the grinding frame through bolt connections.

6. The grinding roller of claim 4, wherein the plurality of grinding blocks are fixed on the grinding frame through bolt connections.

7. A multifunctional crusher for waste tires, comprising the grinding roller of claim 1, wherein: the multifunctional crusher further comprises a box and a cover plate disposed on the box; a grinding space is formed in the box; and the box comprises a material inlet and a material outlet.

8. The multifunctional crusher of claim 7, wherein the box further comprises a first pushing mechanism disposed on a first side of the box and configured for pushing waste tires forward to the grinding roller, and a second pushing mechanism disposed on a second side of the box and configured for pushing the cover plate.

9. The multifunctional crusher of claim 8, wherein the multifunctional crusher further comprises axial blockers extending along an axial direction of the grinding roller, the axial blockers are disposed between the grinding roller and a top of the box, and between the grinding roller and a bottom of the box.

10. The multifunctional crusher of claim 9, wherein the axial blockers are engaged with the grinding roller.

11. The multifunctional crusher of claim 7, wherein the multifunctional crusher further comprises axial blockers extending along an axial direction of the grinding roller; the axial blockers are disposed between the grinding roller and a left side plate of the box, and between the grinding roller and a right side plate of the box.

12. The multifunctional crusher of claim 10, wherein an arc-shaped plate for collecting scraps of waste tires is provided below the axial blockers.

13. The multifunctional crusher of claim 11, wherein the axial blockers are engaged with the grinding roller.

* * * * *